M. MARZETTI.
ELECTRICALLY HEATED VESSEL.
APPLICATION FILED DEC. 2, 1909.
992,021.
Patented May 9, 1911.
2 SHEETS—SHEET 1.
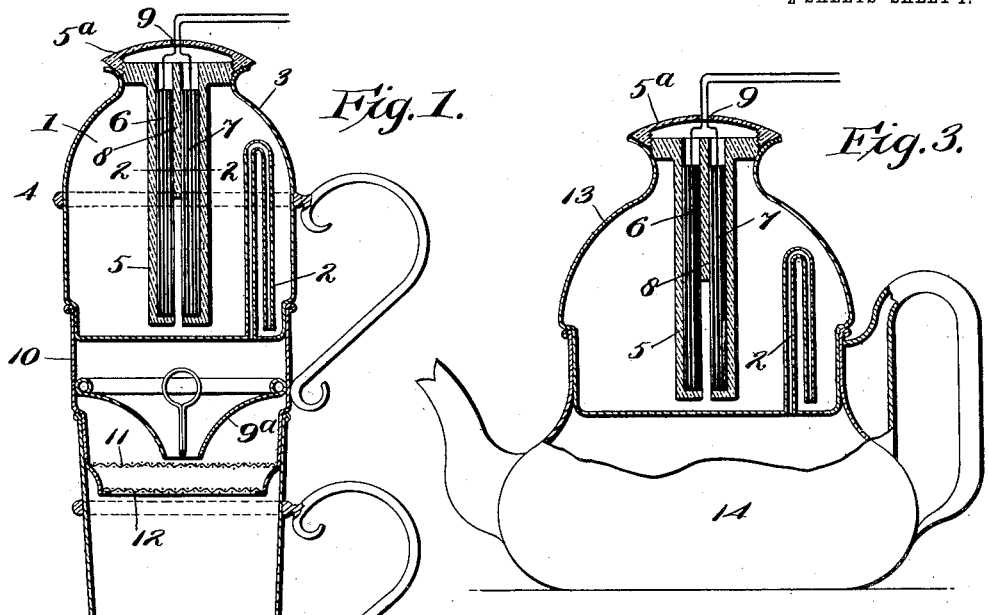
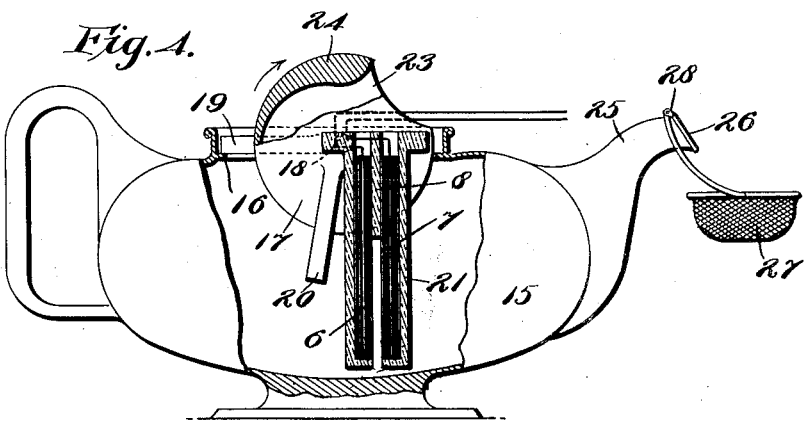
Witnesses
W. Max Durall
Byron B. Collings
Inventor
M. Marzetti,
Wilkinson, Fisher & Witherspoon
his Attorneys

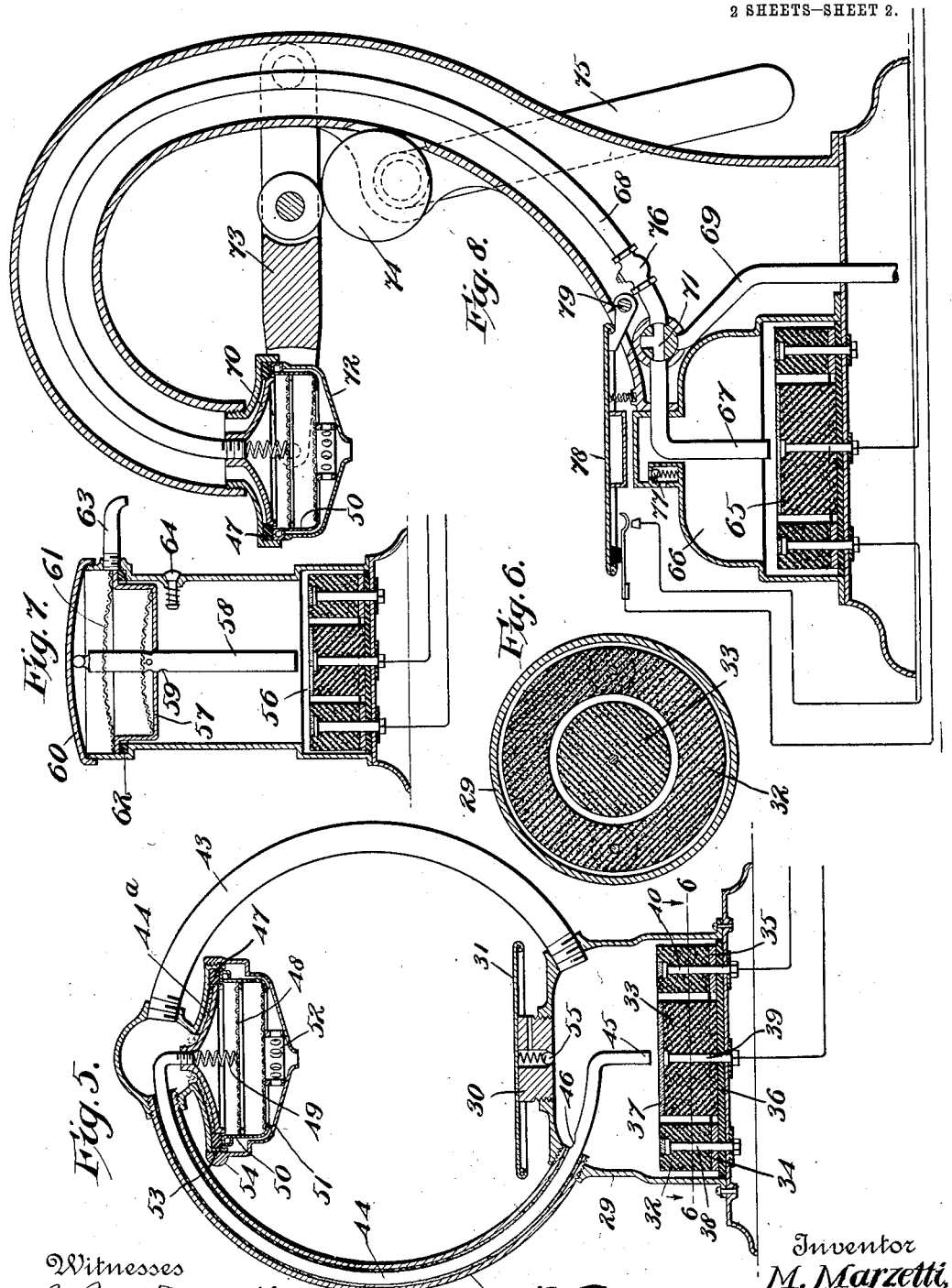

UNITED STATES PATENT OFFICE.

MANLIO MARZETTI, OF MILAN, ITALY.

ELECTRICALLY-HEATED VESSEL.

992,021.  Specification of Letters Patent.  Patented May 9, 1911.

Application filed December 2, 1909. Serial No. 531,020.

*To all whom it may concern:*

Be it known that I, MANLIO MARZETTI, a subject of the King of Italy, residing at Via Montebello No. 14, Milan, Italy, have invented certain new and useful Improvements in Electrically-Heated Vessels; and I do hereby declare the following to be a full, clear, and exact description of the invention, such as will enable others skilled in the art to which it appertains to make and use the same.

I, MANLIO MARZETTI, of Milan, Italy, do hereby declare the nature of this invention and in what manner the same is to be performed to be particularly described and ascertained in and by the following statement.

This invention has for its object to provide automatic apparatus enabling water to be raised to the boiling point for the preparation of coffee, tea and other like uses, the improved apparatus combining a high degree of efficiency with great simplicity.

The principle on which the invention is based is that of the heating of electrolytic conductors, as well as that of metallic conductors as a result of the passage of an electric current through them. The application of this principle is made in the form of two electrodes of graphitic carbon which dip into the water to be heated. The use of this material enables two important objects to be attained, namely, that of avoiding any notable consumption of the electrodes and that of avoiding the risk of any injurious product being dissolved in the water, either when using alternating or continuous currents.

By taking advantage of the electric conductibility of water and the current from town electric installations which are of such an order as to accord very well with the object sought of giving to a heating apparatus on the principle above set forth small dimensions combined with simplicity of construction, various kinds of apparatus for domestic use and for public services have been devised, such as coffee-pots, tea-pots, small boiling apparatus or water heaters for toilet or other purposes, etc.

In the accompanying drawings like characters of reference indicate corresponding parts.

Figure 1 of the accompanying drawings shows in central vertical section one form of the improved apparatus adapted to serve as a coffee-pot. Fig. 2 is a sectional view taken on line 2—2 of Fig. 1. Fig. 3 represents a sectional view of a teapot embodying my invention. Fig. 4 is a similar view of a teapot illustrating a modified form of this invention. Fig. 5 shows a coffee-pot in which the boiling water passes through the coffee powder under pressure. Fig. 6 is a cross sectional view taken on line 6—6 of Fig. 5; and Figs. 7 and 8 are modifications of the coffee-pot illustrated in Fig. 5.

1 is a glass vial or upper vessel in the interior of which a small siphon 2 is arranged and the upper part of which is formed with a hole 3.

Referring to Fig. 1 the vial or vessel 1 is adapted to be filled with water up to the level of the metallic ring 4 that supports it, and an extension 5 of a porcelain stopper $5^a$ is arranged to dip into the water. Within the extension of the porcelain stopper is a device for heating the water consisting of two plates of graphitic carbon 6 and 7 held apart by a diaphragm 8 and communicating with the ends of two flexible conductor wires that pass through a hole 9 formed in the top of the porcelain stopper $5^a$, the other end of the conductor wires terminating in one of the ordinary double peg contacts that can be applied to any suitable place from which electric current can be taken. The surface area of the electrodes and the distance apart thereof varies according to the electric tension at which the apparatus has to work. On applying the peg contact to the source of current the electric circuit is closed through the water in the vial or vessel 1, the water is heated while circulating continuously between the two electrodes, and when it reaches the boiling point the steam escapes through the small hole 3 and through any gaps existing between the stopper 5 and the neck of the vial or vessel 1. These gaps are quickly closed by a meniscus of water that forms there; the hole 3 however is not so closed. A slight pressure is at once set up, sufficient to operate the small siphon 2 after which the whole of the water passes through a funnel $9^a$ into the lower receptacle 10 in the bottom of which coffee powder is placed between two plates 11 and 12, perforated with small holes. At the same time the electric circuit is broken through the absence of water between the two carbon plates. The small hole 3 in the vial or vessel 1 has for its object: (1) to afford an outlet for the products of electrolysis when continuous current is used; (2) to enable the vial or vessel 1 to be completely emptied in spite of the vacuum that tends to form as it is emptied.

In Fig. 2 13 is an upper vessel adapted to be partially filled with water and fits into the top portion of a tea-pot 14 in the bottom of which is placed tea. In the upper vessel 13 is a porcelain stopper carrying two plates of graphite carbon, and there is also a siphon, all of which parts are similarly arranged as are those in the vial or vessel 1 of the coffee-pot.

Referring to Fig. 4 15 is an infusion holder of the ordinary kind, but of slightly flattened form. The opening is formed with a flange 16, on the interior of which two horizontal fillers or ribs are formed. In this opening there fits a spherical vessel 17 adapted to hold tea and placed on a horizontal axis 18 about which it is adapted to turn through about a quarter of a revolution, the amount of rotation being limited by suitable stops, preferably two semi-circular portions 19 and 20 extending around one-half its periphery. To the spherical vessel is fixed a piece of porcelain 21 similar to that forming the extension of the stopper of the coffee-pot shown in Figs. 1 and 2 and inside which are placed the two graphitic plates communicating with the conductors that are led out from the spherical vessel itself through the tubular pivot 18. The upper part of the spherical vessel 17 is to a large extent empty and it is left open at 23, 24 being a counterweight that causes the spherical vessel to turn in the direction of the arrow and consequently causes the tea to overflow as soon as the spherical vessel has become slightly displaced in that direction. As the spherical vessel turns the electrodes carried thereby are raised out of the boiling water and the electric circuit is broken. The spout 25 is closed by a small plate 26 made in one piece with a strainer 27, the whole being pivoted at 28, so that upon the teapot being inclined the spout is automatically opened. The supports or socket bearings of the pivots 28 as well as those of the pivot 18 of the spherical vessel are such that the pivots simply rest therein so that they can be easily removed at will by simply lifting them out. When the receptacle 15 has been filled with water to such a level as not to wet the spherical vessel and the tea placed in the latter, and when the electrical circuit has been closed and the water reaches the boiling point there are formed around the line of contact of the spherical vessel and the portion 19 thereof as well as on the end of the spout 25, menisci which, while insuring impermeability, enable a slight pressure to be set up, which by acting on the portion 19 causes the spherical vessel to overturn.

Referring now to Fig. 5 29 is a metallic receptacle formed with an opening through which the water is introduced and which opening is furnished with a screw stopper 30 formed in one piece with a small plate 31 on which the cup to be filled is placed. On the bottom of the receptacle 29 are fixed the two graphitic carbon electrodes in the form of concentric cylinders 32 and 33, the outer or hollow one of which is carried on the base by means of two raised bosses 34 and 35, so as to be slightly raised above the rest of the base. The insulation is effected by means of a rubber disk 36 covering the whole of the metal bottom and on which are placed the carbons, the inner cylinder being in addition covered by an insulating disk 37 made of glass, porcelain or the like. Three metal bolts 38, 39 and 40 serve to hold the cylinders 32 and 33 against the bottom; each bolt being provided at the lower end with an insulating washer of vulcanized fiber and at its upper end with a lead seal, which insures a good water-tight joint and so renders the electric contact better. Two of these bolts, 39 and 40 serve to establish the electric communication for the electrodes, and same are connected with the supply wires in any suitable manner. The object of this arrangement of the two concentric cylinders, insulated as described, is to prevent the metallic walls of the receptacle from acting as electrodes, in which case corrosion of such walls and a dissolving of deleterious substances in the water would occur. One of two arc-shaped tubes 42 and 43 supporting the upper part of the apparatus contains a tube 44 of smaller diameter, covered with asbestos and extending downwardly into the interior of the receptacle 29 its lower end 45 opening slightly above the level of the top of the carbons. A hole 46 is formed in the wall of said tube 44 which tube leads into a flattened cup-shaped box or vessel 44ª made with a double wall having an interposed layer of asbestos and furnished with an annular rubber packing 47. A metal disk 48 formed with small holes is fixed inside said box by means of a strong spiral spring 49. A finely perforated basket 50 for containing the coffee powder is inclosed by a funnel 51 and between same is interposed a perforated ring 52. The upper edge of the basket 50 is pressed against the packing 47 while the finely perforated disk 48 presses on the coffee powder when the funnel is screwed onto the metal box 44ª as at 53. Three small metal knobs, one of which is shown in section at 54 in the figure, serve for screwing the funnel to the box. The object of raising the coffee basket by means of the ring 52 is to prevent it from turning with the funnel which would result in damaging the rubber packing. 55 is a small safety-valve.

When the water is introduced into the receptacle 29 through the upper opening up to the level of the bottom of the hole 46 and the electric circuit closed, the water rapidly reaches the boiling point. The jets of steam that first form escape through the hole 46 pass through the tube 44 as far as the box 44ª and reach the coffee powder. Afterward, on the production of steam increasing, the water begins to rise through the open end 45 of the tube 44 and traverses the same path, mixed with the steam, up to the coffee powder, through which it passes rapidly. Finally, when the water in the receptacle 29 has fallen below the level of the open end 45, water no longer passes through the tube 44 but only steam, which passes through the coffee powder. The arrangement of the tube 44 and the mechanism described in connection therewith insures the attainment of the following objects: (1) prevents water being cooled to any noticeable extent before reaching the coffee powder; (2) admits of working at a very strong pressure and therefore at a higher temperature without unduly accelerating the lixiviation process, the first object being facilitated by the asbestos covering and the second by the compression of the coffee between the finely perforated plate 48 and the bottom of the basket 50.

Referring to Fig. 7 the heating apparatus 56 is similar to that of the coffee-pot shown in Fig. 5; the receptacle 57 for the coffee has an extension in the form of a tube 58 open at the bottom and having a hole 59 formed in it above the level of the water. A screwed cover 60 presses on the finely perforated disk 61 and the latter presses on the receptacle 57 a fluid-tight joint being insured with the aid of rubber packing 62. The coffee issues automatically through the spout 63 under which the cup to be filled is placed; 64 is a small safety-valve.

In Fig. 8 the heating apparatus 65 is similar to that of the coffee-pot shown in Fig. 5. The whole of the internal portions of the receptacle 66 as well as those of the tube 67 are coated with insulating enamel. The tube 67 on leaving the receptacle divides into two branches at 68 and 69, the branch 68 leading to the double-bottomed box 70 while the branch 69 is connected to a water supply pipe. Arranged at the juncture point is a three-way cock 71.

The funnel 72, which carries the finely perforated bottom containing the coffee powder, is adapted to be raised by a lever 73. A pull-rod, not shown, connects an eccentric 74, formed in one with the lever 75, to the three-way cock 71 so that when the eccentric is raised communication is established between the tube 67 and the branch 68, while when the eccentric is lowered communication is established between the tube 67 and the branch 69. 76 is a small upwardly-acting non-return valve and 77 is a safety-valve.

78 is a small plate on which the cup to be filled is placed, and this plate is capable of being slightly displaced by angular movement about a pivot 79, such displacement being adapted so as to cause the electric circuit of the water-heating device to be closed by any suitable means, so that heating will begin as soon as the cup to be filled is placed on the small plate and cease upon its removal therefrom.

On raising the lever 75 the eccentric 74 is lowered and along with same a lever 73 and the funnel 72. At the same time the tube 67 is placed in communication with the water-pipe through the branch 68 and as there can only remain steam in the receptacle 66 after coffee having been made, water enters the receptacle, while the operator or attendant changes the coffee powder in the funnel 72. Then the lever 75 is lowered, thereby causing the funnel 72 to bear against the box 70 and communication to be reëstablished between the branches 67 and 68. Upon the cup to be filled being placed on the small plate 78 the electric circuit is closed and the apparatus starts working in the same manner as hereinbefore described with reference to the coffee-pot shown in Fig. 5.

I claim—

1. In an electric heater, the combination of a vessel adapted to contain water to be heated, a plurality of electrodes in the vessel adapted to be immersed in said water, a receptacle adapted to contain the material to be infused, and means in said vessel adapted to convey the boiling water therefrom to said receptacle, substantially as described.

2. In an electric heater, the combination of a vessel adapted to contain water to be heated, a plurality of electrodes of graphitic carbon arranged in the vessel, a receptacle adapted to contain the material to be infused, said vessel being provided with a discharge conduit which operates when the water contained in said vessel begins to boil and for conveying the water to the receptacle, said vessel being so constructed that when the water is carried away from between the electrodes the passage of the electric current ceases automatically, substantially as described.

3. In an electric heater, the combination of a vessel adapted to contain water to be heated, a plurality of electrodes of graphitic carbon, a receptacle adapted to contain the material to be infused, the vessel being provided with a discharge siphon, and a passage for the escape of the products of electrolysis, and when the siphon is put in action the water begins to escape and completely empties said vessel, leaving the electrodes dry and automatically breaking the electric circuit, substantially as described.

4. In an electric heater, the combination of a vessel adapted to contain water to be heated, an insulating disk on the bottom of the vessel and suitable electrodes resting thereon, a receptacle adapted to contain the material to be infused, said vessel being provided with a discharge tube for conveying the products of electrolysis to the receptacle, and provided with an opening, so that the liquid is forced through the discharge tube when it boils and escapes completely by the pressure of the steam, leaving the electrodes dry and automatically breaking the electric circuit, substantially as described.

5. In an electric heater, the combination of a vessel adapted to contain water to be heated, an insulating disk on the bottom of the vessel, and two electrodes of graphitic carbon in the form of coaxial cylinders resting thereon, a receptacle adapted to contain the material to be infused, and a pipe leading from the inside of said vessel adapted to convey the boiling water therefrom to said receptacle, substantially as described.

6. In an electric heater, the combination of a containing vessel and suitable electrodes on the bottom thereof, of a tube leading from the containing vessel and provided with an opening for steam, the upper end of the tube opening into a receptacle, means arranged in the receptacle for holding powdered coffee, and the receptacle having an outlet for the escape of the liquid forced through the powdered coffee by the pressure created by the steam of the boiling liquid, substantially as described.

7. In an electric heater, the combination of a containing vessel and suitable electrodes on the bottom thereof, of a tube leading from the containing vessel and provided with an opening for steam, the upper end of the tube opening into a receptacle, perforated plates arranged in the receptacle for holding powdered coffee, and a funnel extending from the bottom of said receptacle for the escape of the liquid forced through the powdered coffee by the pressure created by the steam of the boiling liquid, substantially as described.

8. In an electric heater, the combination of a containing vessel and suitable electrodes on the bottom thereof, of a hollow arch-shaped casing projecting from the containing vessel, a tube leading from the containing vessel and inclosed by said casing, the tube being provided with a steam inlet opening, the upper end of the tube opening into a receptacle, and means arranged in the receptacle for holding powdered coffee, said receptacle having an outlet for the escape of the liquid forced through the powdered coffee, substantially as described.

9. In an electric heater, the combination of a containing vessel and suitable electrodes on the bottom thereof, of a hollow arch-shaped casing projecting from the containing vessel, a tube leading from the containing vessel and inclosed by said casing, the tube being covered with asbestos and provided with a steam inlet opening, a receptacle at the upper end of the tube, perforated plates arranged in the receptacle for holding powdered coffee, and a funnel extending from the bottom of said receptacle for the escape of the liquid forced through the powdered coffee when the water begins to boil, substantially as described.

10. In an electric heater, the combination of a containing vessel and suitable electrodes on the bottom thereof, of a tube leading from the containing vessel, a branch tube in alinement with said tube, a water supply pipe, and means for effecting a connection between the water supply pipe and the tube, the upper end of the tube opening into a powdered coffee receptacle having an outlet for the escape of the liquid forced through the powdered coffee by the pressure of the steam from the boiling water, substantially as described.

11. In an electric heater, the combination of a containing vessel and suitable electrodes on the bottom thereof, of a tube leading from the containing vessel, a branch tube in alinement with said tube, a water supply pipe, a three-way valve arranged at the juncture of the tube, the branch tube and the supply pipe, means for effecting a connection between the water supply pipe and the tube, and the upper end of the tube opening into a powdered coffee receptacle having an outlet for the escape of the liquid forced through the powdered coffee, substantially as described.

12. In an electric heater, the combination of a containing vessel and suitable electrodes in the bottom thereof, of a tube leading from the containing vessel, a branch tube in alinement with said tube, a water supply pipe, means for effecting a connection between the water supply pipe and the tube, the upper end of the branch tube being enlarged, a pivotally arranged powdered coffee receptacle adapted to register with the enlarged end of the branch tube and having an outlet for the liquid forced therethrough, and means for actuating the means for effecting a connection between the water supply pipe and the tube and also for raising the powdered coffee receptacle in engagement with the enlarged end of the branch tube, substantially as described.

13. In an electric heater, the combination of a containing vessel and suitable electrodes on the bottom thereof, of a hollow arch-shaped casing projecting from the containing vessel, a tube leading from the containing vessel, a branch tube in alinement with the end of said tube and inclosed by the casing, a water supply pipe, a pivotally arranged powdered coffee receptacle adapted to register with the upper end of the branch tube and having an outlet for the liquid forced therethrough, means for effecting a connection between the water supply pipe and the tube and also raising the powdered coffee receptacle in engagement with the upper end of the branch tube, a table located under the outlet of the powdered coffee receptacle for holding a cup, and means for opening the electric circuit of the electrodes when the cup is removed, substantially as described.

14. In an electric heater, the combination of a containing vessel and suitable electrodes on the bottom thereof, of a hollow arch-shaped casing projecting from the containing vessel, a tube leading from the containing vessel, a branch tube in alinement with the end of said tube and inclosed by the casing, a non-return valve in the branch pipe, a water supply pipe, a three-way valve arranged at the juncture of the tube, the branch tube and the water supply pipe, an arm pivotally connected to the casing, a powdered coffee receptacle carried by the arm and adapted to register with the upper end of the branch tube, said receptacle having an outlet for the liquid forced therethrough, and an eccentric engaging said arm and connected with said valve for effecting a connection between the water supply pipe and the tube and also for raising the powdered coffee receptacle in engagement with the upper end of the branch tube, substantially as described.

In testimony whereof, I have affixed my signature, in presence of two witnesses.

MANLIO MARZETTI.

Witnesses:
　CHAS. H. FISCHER,
　JAMES B. YOUNG.